US006832470B2

(12) United States Patent
Dewis

(10) Patent No.: US 6,832,470 B2
(45) Date of Patent: Dec. 21, 2004

(54) RECUPERATOR CONFIGURATION

(75) Inventor: David W. Dewis, Stuart, FL (US)

(73) Assignee: Elliott Energy Systems, Inc, Stuart, FL (US)

( * ) Notice: Subject to any disclaimer, the term of this patent is extended or adjusted under 35 U.S.C. 154(b) by 77 days.

(21) Appl. No.: 10/328,616

(22) Filed: Dec. 23, 2002

(65) Prior Publication Data

US 2004/0118101 A1 Jun. 24, 2004

(51) Int. Cl.[7] .............................................. F02C 7/10
(52) U.S. Cl. ..................................... 60/39.511; 60/784
(58) Field of Search ........................ 60/39.182, 39.571, 60/784; 165/4

(56) References Cited

U.S. PATENT DOCUMENTS 2,914,917 A * 12/1959 Van Nest ................. 60/39.511
4,180,973 A * 1/1980 Forster et al. ........... 60/39.511
4,213,297 A * 7/1980 Forster et al. ........... 60/39.511

* cited by examiner

Primary Examiner—Louis J. Casaregola
(74) Attorney, Agent, or Firm—Norman Friedland

(57) ABSTRACT

The flow path of the exhaust of a recuperator of a microturbine engine system is routed to insulate the turbine exhaust in the recuperator. The recuperator is encapsulated for defining a passage for flowing the exhaust over the outer diameter of the recuperator so as to insulate the heat within the recuperator. A by-pass system that is operable mechanically or automatically directs turbine exhaust to by-pass the recuperator is disclosed in another embodiment. The by-pass serves to trim the efficiencies of the original manufactured microturbine engines so that all the engines attain a given preselected matching efficiency level. The by-pass can also be utilized to control the temperature of a boiler, chiller or other elements incorporated in the microturbine system by controlling the turbine exhaust to by-pass the recuperator.

5 Claims, 3 Drawing Sheets

RECUPERATOR CONFIGURATION

TECHNICAL FIELD

This invention relates to recuperators and particularly to the configuration of an annular recuperator for enhancing heat transfer and in another embodiment this invention includes a by-pass system for by-passing the annular recuperator for boosting the temperature of the heat transfer medium being utilized for other components in a microturbine system.

BACKGROUND OF THE INVENTION

This invention constitutes an improvement over the annular recuperator structure disclosed in co-pending patent application Ser. No. 09/934,640 filed on Aug. 22, 2001 by William R. Ryan entitled RECUPERATOR FOR USE WITH TURBINE/TURBO-ALTERNATOR, published on Dec. 20, 2001, and commonly assigned to the assignee of this patent application. As shown in this patent, the recuperator includes a heat exchange structure where the compressor discharge air is placed in indirect heat exchange with the turbine exhaust prior to being injected into the ambient. The problem with this heretofore known recuperator is that after the turbine exhaust has been spent in the heat exchanger it is discharged into ambient in such a manner that the heat exchange is not as efficient as it should be, leaving a deficit in the heat exchange efficiency between the mediums. Also, there is no mechanism or concern disclosed in the Ryan patent application for utilizing the turbine exhaust prior to being placed in indirect heat relation in the recuperator and hence, that system lacks the ability to boost the temperature of other components in the microturbine system or match efficiencies from manufactured engine to engine that have varying efficiencies owing to manufacturing tolerances.

I have found that by encapsulating the recuperator with the spent exhaust gas exiting the recuperator, less heat in the heat exchange process of the recuperator is rejected prior to the heat recovery for which the recuperator is designed. Also, because the annular exhaust opening is annular and surrounds the recuperator core, this arrangement provides uniform circumferential back pressure, thus, resulting in a more even exhaust flow distribution and hence, higher effectiveness. Essentially, the essence of this invention is to provide an improved the discharge passage for the exhaust discharging from the recuperator in order to enhance the heat transfer efficiency of the fluids that are in indirect heat exchange relation in the recuperator.

In addition, this invention contemplates the option of including a by-pass system which may or may not be modulated that serves to power a co-generator system or boost the temperature of the heat exchange medium. In another application of the by-pass system, in order to assure that each of the engines manufactured has the same efficiency rating, the system is designed so that the by-pass is utilized to control the discharge of the turbine so as to trim each engine in order to match the engine's efficiency which would otherwise be different owing to manufacturing tolerances.

SUMMARY OF THE INVENTION

An object of this invention is to provide for an annular recuperator of a microturbine system, means for encapsulating the recuperator with spent turbine exhaust so as to reduce heat losses within the recuperator. In addition, the annular design of the exhaust of the recuperator serves to provide a uniform circumferential back pressure, with a consequential evening or, in the very least, having the propensity for evening, the exhaust flow distribution which results in an increase in heat exchange transfer effectiveness and hence, an increase in heat transfer efficiency.

Another object of this invention is to provide a by-pass valve judiciously located in the recuperator for powering a co-generating system with turbine waste heated fluid discharging from the turbine and by-passing the recuperator. The by-pass can be operated either manually or automatically so as to provide a predetermined heat exchange relationship in the co-generation system.

A still further object of this invention is to provide an adjustable by-pass valve associated with the recuperator for trimming the efficiency of the microturbine engine whose efficiency is subjected to manufacturing tolerances so as to match a predetermined value.

The foregoing and other features of the present invention will become more apparent from the following description and accompanying drawings.

These figures merely serve to further clarify and illustrate the present invention and are not intended to limit the scope thereof.

DETAILED DESCRIPTION OF THE INVENTION

The description of the preferred embodiment illustrates the invention when applied to a system employing a microturbine engine and recuperator driving an alternator for generating electricity. However, it is to be understood, as those skilled in this technology will appreciate, this invention relates to a microturbine system which can be employed for powering other components or systems such as pumps, vehicles, and the like. In the description of this invention the following terms denote the following definitions:

1. Microturbine engine is essentially a turbine type of power plant;
2. Microturbine system is a system employing a microturbine engine for powering a system or device for generating electricity or pumping and the like and includes a recuperator; and
3. A recuperator is an heat exchanger with the heat transport medium and medium heated are placed indirect heat exchange and serves to pre-heat the compressor discharge air of the microturbine engine with turbine discharge fluid prior to being admitted into the combustor of the microturbine engine.

4. Co-generation means an additional system such as a boiler utilized to obtain hot water or steam or the like or a chiller used for absorption in an air conditioning system.

For the sake of simplicity and convenience the details of the microturbine engine and recuperator are omitted herefrom and for details thereof reference should be made to U.S. Pat. No. 6,314,717 granted to Teets et al on Nov. 13, 2001 entitled ELECTRICITY GENERATING SYSTEM HAVING AN ANNULAR COMBUSTOR commonly assigned to the assignee of this patent application, and to the Ryan application, supra, both of which are incorporated herein by reference. Also, references should be made to the microturbines manufactured by the assignee, Elliott Energy Systems, Inc., of Stuart, Fla. and, particularly of the types exemplified by Model Number TA-80 which is also incorporated herein by reference.

Figure 1:
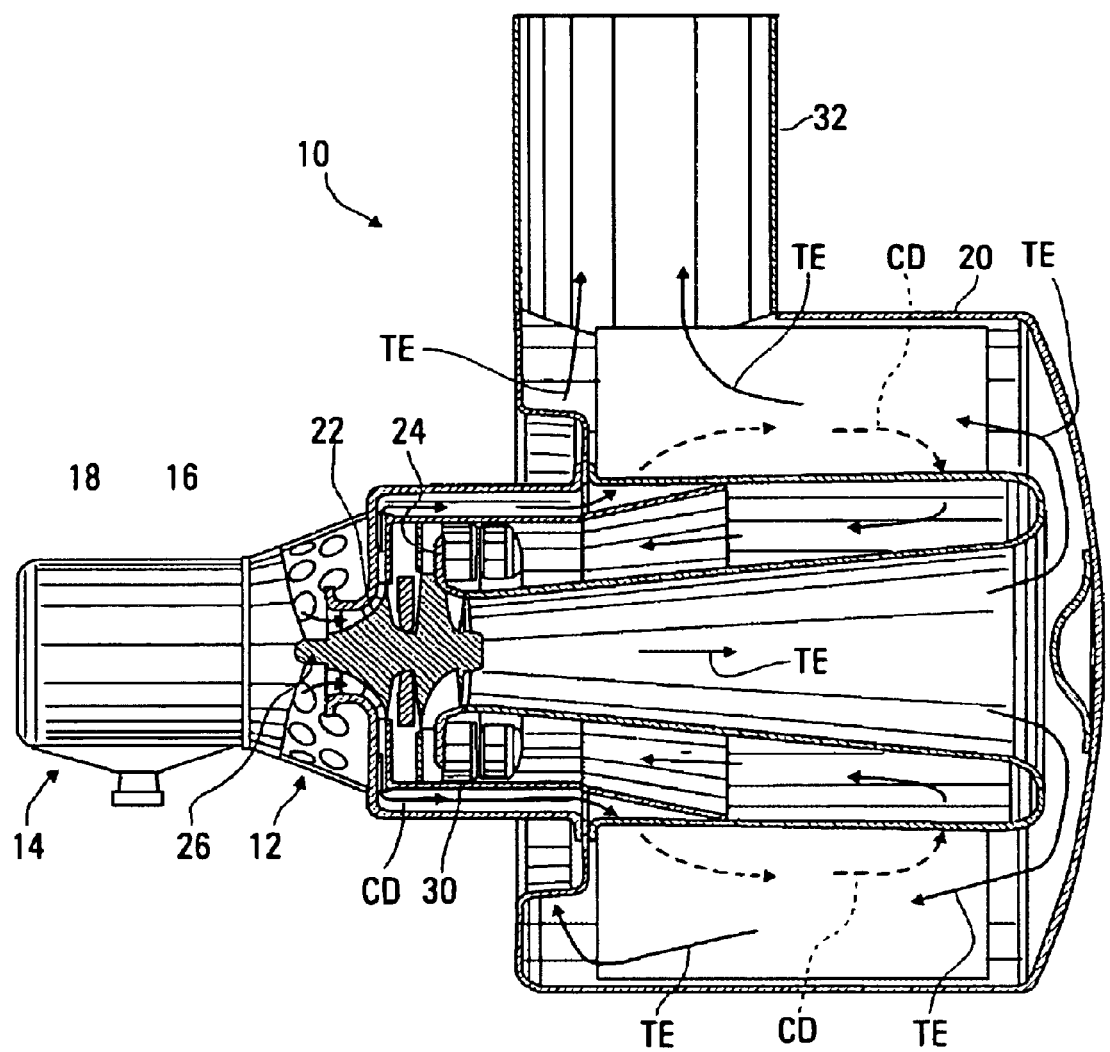
FIG. 1 is a schematic illustration of a prior art microturbine system showing a microturbine engine and an annular recuperator powering an electrical alternator for generating electricity.

To best understand this invention reference will now be made to FIG. 1 which is a prior art illustration of a microturbine system generally indicated by reference numeral 10 comprising a microturbine engine 12 and an electrical generating system generally indicated by reference numeral 14 including an alternator 16 and an inverter 18 and an annular recuperator 20. As is typical in electrical generating system utilizing a microturbine, the compressor 22, turbine 24 and alternator 16 are commonly connected by a single shaft 26. Air from the ambient is admitted into compressor 22 where it is compressed and transmitted to the recuperator 20 where the compressor discharge air picks up heat from the turbine exhaust and then returned to the combustor 30 of the microturbine engine 12. As is apparent from the foregoing, the exhaust from the turbine 24 is directed into the recuperator where it is placed in indirect heat exchange with the compressor discharge air and then discharged through the flue or chimney-like passage 32.

Figure 2:
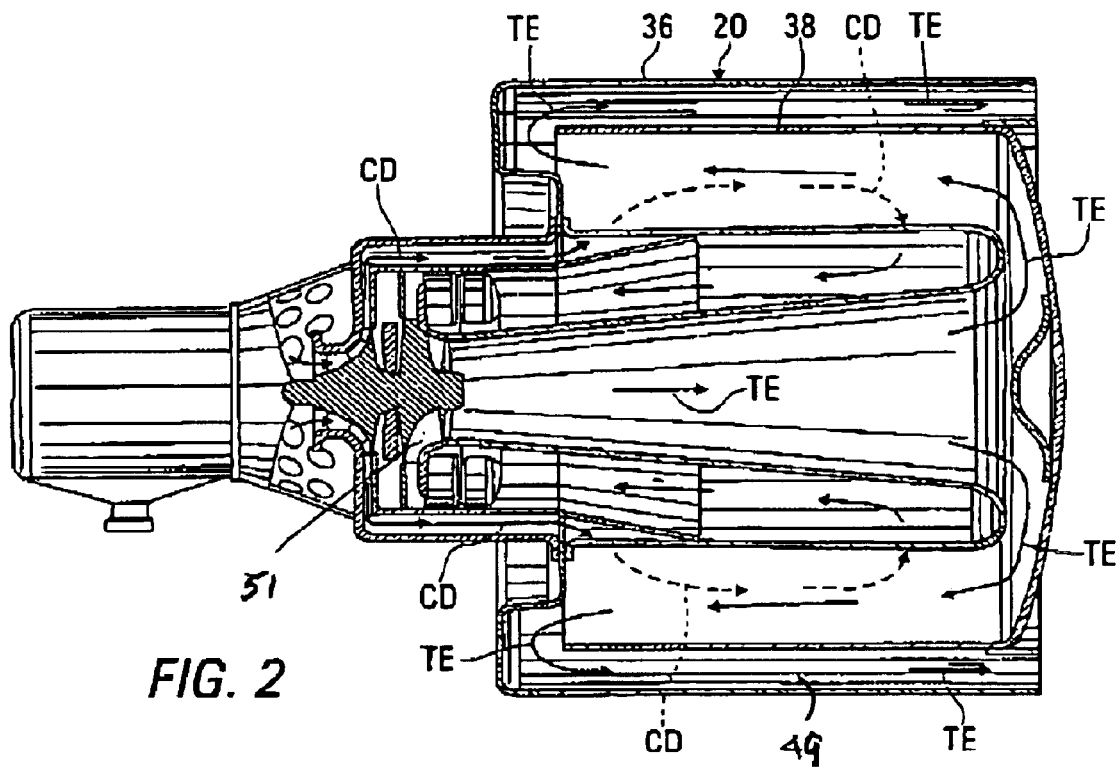
FIG. 2 is a schematic illustration of a partial view of the annular recuperator modified in accordance with this invention.

In accordance with this invention and as best seen in FIG. 2, (all like or similar elements bear the same reference numerals for all of the Figs.) the configuration of the annular recuperator 20 is modified so that the chimney-like passage 32 is eliminated and a generally cylindrically shaped container or enclosure 36 encapsulates the recuperator 20. In this configuration of the recuperator 20, the spent turbine exhaust, i.e. turbine exhaust after it has completed its indirect heat transfer with the compressor discharge air, is now directed to surround the heat transport medium, namely, the turbine exhaust, so as to form an insulated blanket for the turbine exhaust that is adjacent the inner wall 38 of the recuperator 20. Since the hot gas, i.e. the spent turbine exhaust, exiting the recuperator 20 is directed back around the outside diameter of recuperator 20, the spent turbine exhaust forms an insulation layer capturing heat rejected by the turbine exhaust. The consequence of this invention is that the temperature delta (differential) across the outer skin of the recuperator 20 is greatly reduced where, for example, the delta is less than 100 degrees Fahrenheit (° F.) in the inventive configuration, whereas in the prior art this delta temperature could exceed 400° F. Obviously, by encapsulating the recuperator 20 with a gas at a lower temperature results in a lower heat flux to the enclosure. The annular design of the container 36 serves to discharge the exhaust of the recuperator to provide a uniform circumferential back pressure within the recuperator, with a consequential evening or, in the very least, having the propensity for evening, the exhaust flow distribution which results in an increase in heat exchange transfer effectiveness and hence, an increase in heat transfer efficiency.

Figure 3:
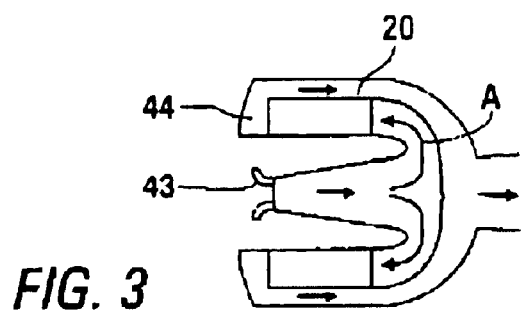
FIG. 3 is a fragmentary schematic illustration of the invention for enhancing the heat exchange in the recuperator of a microturbine system.

FIG. 3 is a schematic illustration of the present invention where the turbine exhaust represented by arrow A discharges from the turbine bucket 51, flows internally in recuperator 20 toward the aft end thereof and then, flows toward the fore end thereof and discharges through the passage or header 44 defined by the cylindrically shaped container or enclosure 36, through the annular passage 49 and then discharged. Since the temperature of the spent turbine exhaust is sufficiently high, say 500° F., the spent turbine exhaust lends itself to be utilized to heat water in a boiler (not shown). Thus, in a residential or commercial building or complex, the microturbine system can be employed to provide both electricity and provide hot water.

Figure 4:
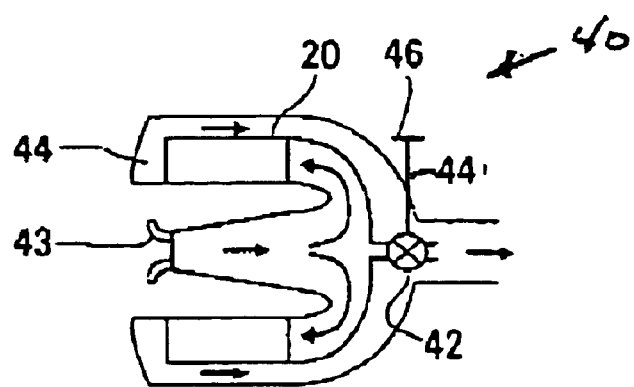
FIG. 4 is a fragmentary schematic illustration of another embodiment modifying the invention depicted in FIG. 3 to include a by-pass system for trimming engine and electrical generation efficiencies.

FIG. 4 exemplifies the system depicted in FIG. 3, but modified to include a by-pass system generally indicated by reference numeral 40. As shown in FIG. 4, the by-pass system 40 includes the by-pass valve 42, which can be operated manually by the valve stem 44 and handle 46 or by an electrical solenoid (not shown) or by any other well known mechanisms. One of the applications for the by-pass system 40 is to tune originally manufactured microturbine system that because of manufacturing tolerances that are typical in this type of manufacturing processes, the efficiencies of the engines vary. The by-pass valve 42 can be adjusted to alter the discharge of the turbine exhaust so that the efficiency of a given engine can be adjusted to match the efficiency specified in the engines' specification.

Another application of the by-pass system 40 is to utilize the spent turbine exhaust, as discussed in connection with the description of the embodiment depicted in FIG. 3, and power a water boiler (not shown) to obtain hot water. It is apparent from the foregoing that the manually operated system can be set to provide a given temperature of the boiler and once valve 42 is set, the boiler is subjected to the operation of the microturbine engine and alternator. Hence, if the load imposed on the microturbine engine changes, the change would affect the temperature of the turbine and as a consequence the temperature of the turbine exhaust and ultimately to the spent turbine exhaust.

Figure 5:
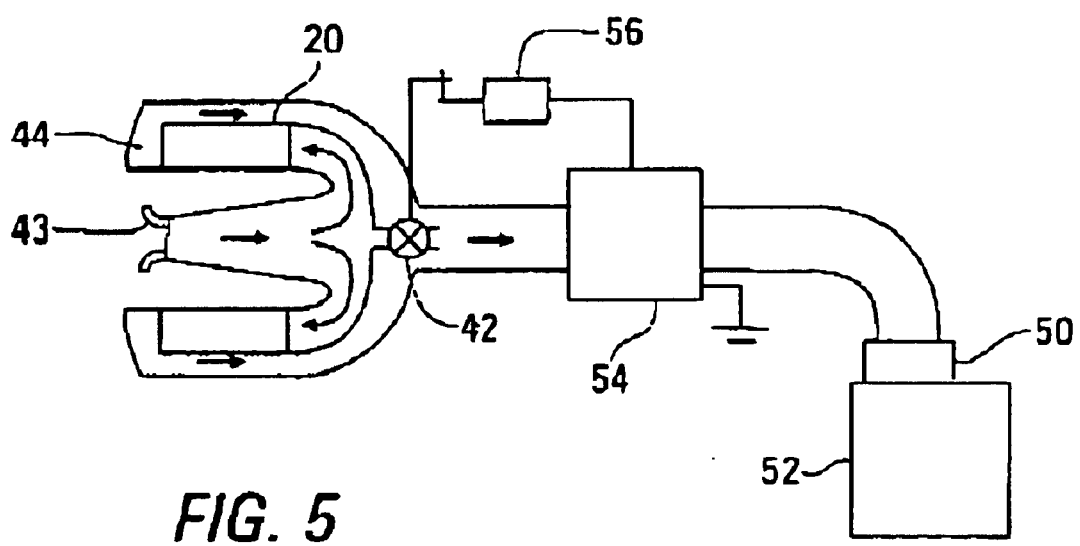
FIG. 5 is a schematic of a system identical to that depicted in FIG. 4 that is modified to include automatic waste heat control.

FIG. 5 addresses this problem by including an automatic system for controlling valve 42. In this system a temperature sensor 50, which can be any well known commercially available temperature sensor, monitors the temperature in the boiler 52 and inputs the controller or comparator 54, which also, is can be a well known commercially available item. The voltage difference between a set value or pre-selected boiler temperature and the actual temperature measured by the temperature sensor 50 is relayed to the actuator 56 which serves to adjust the opening and closing of valve 42. The actuator 56 can be any well known commercially available actuator. The system just described can be designed to utilize electrical, electronic or pneumatic controls which will be predicated on any given design of the microturbine system.

The by-pass system described in the immediate above paragraphs afford the following advantages:

1. Reduces electrical efficiency to a desired level at ATP;
2. Trim out efficiency scatter so that all engines being manufactured are shipped at a given efficiency level;
3. The automated by-pass system varies the by-pass to meet changing application needs; and
4. The automated by-pass system varies the by-pass to maintain boiler temperature.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. In combination, a microturbine engine and recuperator including interconnection between the microturbine engine and the recuperator, said microturbine engine having a compressor, combustor and turbine wherein air from ambient flows into the compressor and is routed to the recuperator to be in indirect heat exchange with the exhaust from the turbine prior to being admitted into the combustor, the improvement comprising a container surrounding said recuperator defining a discharge end and also defining a passage for leading turbine exhaust after being in indirect heat exchange with the compressor air over the outer wall of said recuperator into said discharge end whereby the turbine exhaust in said passage defines an insulator to the mediums in indirect heat exchange in said recuperator, a by-pass valve between said turbine and said recuperator and means for opening and closing said by-pass valve for regulating the flow of turbine discharge fluid.

2. The combination of claim 1 wherein said valve includes a movable valve stem connected to said by-pass valve to adjust the flow therethrough, a handle connected to said valve stem for moving said valve stem whereby said by-pass is moved upon movement of said handle.

3. The combination of claim 1 wherein said by-pass valve is controlled to adjust the efficiency of the microturbine engine whereby the efficiency of all the microturbine being manufactured is tuned to meet a predetermined specification.

4. The combination of claim 1 including an automated system attached to said by-pass valve, said automated system including an actuator and control means connected to said actuator for positioning said actuator as a function of a predetermined value.

5. The combination of claim 4 including a temperature sensor, said control means including means for setting a desired temperature signal, said temperature sensor creating a signal indicative to the actual temperature value of the temperature being sensed, means for comparing the set desired temperature signal to the actual temperature signal created by said temperature sensor, and said actuator being controlled by said control means as a function of the difference between the actual temperature signal and the desired temperature signal produced by said control means.

* * * * *